US009672614B2

(12) United States Patent
Dwivedi

(10) Patent No.: US 9,672,614 B2
(45) Date of Patent: Jun. 6, 2017

(54) MULTI-STRUCTURE ATLAS AND/OR USE THEREOF

(71) Applicant: KONINKLIJKE PHILIPS N.V., Eindhoven (NL)

(72) Inventor: Shekhar Dwivedi, Willoughby Hills, OH (US)

(73) Assignee: KONINKLIJIE PHILIPS N.V., Eindhoven (NL)

( * ) Notice: Subject to any disclaimer, the term of this patent is extended or adjusted under 35 U.S.C. 154(b) by 22 days.

(21) Appl. No.: 14/433,765

(22) PCT Filed: Sep. 27, 2013

(86) PCT No.: PCT/IB2013/058912
§ 371 (c)(1),
(2) Date: Apr. 6, 2015

(87) PCT Pub. No.: WO2014/057383
PCT Pub. Date: Apr. 17, 2014

(65) Prior Publication Data
US 2015/0243026 A1    Aug. 27, 2015

Related U.S. Application Data

(60) Provisional application No. 61/711,405, filed on Oct. 9, 2012.

(51) Int. Cl.
*G06K 9/00* (2006.01)
*G06T 7/00* (2017.01)
(Continued)

(52) U.S. Cl.
CPC ............ *G06T 7/0012* (2013.01); *G06K 9/46* (2013.01); *G06K 9/4604* (2013.01); *G06T 7/11* (2017.01);
(Continued)

(58) Field of Classification Search
USPC .................................................. 382/128–134
See application file for complete search history.

(56) References Cited

U.S. PATENT DOCUMENTS 6,141,437 A    10/2000 Xu et al.
2006/0239522 A1    10/2006 Ferrant et al.
(Continued)

OTHER PUBLICATIONS

Ballangan, C., et al.; Automated detection and delineation of lung tumors in PCT-CT volumes using a lung atlas and Iterative Means-SUV threshold; 2009; Proc. of SPIE Medical Imaging; vol. 7259:1-8.
Bi, L., et al.; Automated and Robust PERCIST-based Thresholding framework for whole body PET-CT studies; 2012; IEEE EMBS; pp. 5335-5338.
(Continued)

*Primary Examiner* — Alex Liew

(57) ABSTRACT

An image data processor (106) includes a structural image data processor (114) that employs a multi-structure atlas to segment a region of interest from structural image data that includes tissue of interest and that segments the tissue of interests from the region of interest. The image data processor further includes functional image data processor (116) that identifies the tissue of interest in functional image data based on the segmented tissue of interest. An image data processor includes a multi-structure atlas generator (104) that generates a multi-structure atlas. The multi-structure atlas physically maps structure to tissue of interest such that locate the structure in structural image data based on the multi-structure atlas localizes the tissue of interest to the region of interest.

25 Claims, 5 Drawing Sheets

(51) Int. Cl.
*G06K 9/46* (2006.01)
*G06T 7/11* (2017.01)

(52) U.S. Cl.
CPC ............... *G06K 2009/4666* (2013.01); *G06T 2207/10072* (2013.01); *G06T 2207/20128* (2013.01); *G06T 2207/30008* (2013.01); *G06T 2207/30061* (2013.01)

(56) References Cited

U.S. PATENT DOCUMENTS

| | | |
|---|---|---|
| 2009/0067692 A1 | 3/2009 | Breeuwer |
| 2009/0196481 A1 | 8/2009 | Li et al. |
| 2010/0296718 A1* | 11/2010 | Ostrovsky-Berman . G06T 7/602 382/133 |
| 2010/0322493 A1 | 12/2010 | Wei |
| 2011/0052018 A1 | 3/2011 | Blaffert et al. |
| 2012/0027272 A1* | 2/2012 | Akinyemi ............ G06T 7/0081 382/128 |

OTHER PUBLICATIONS

Gigengack, F., et al.; Atlas-Based Whole-Body PET-CT Segmentation Using a Passive Contour Distance; 2012; Medical Computer Vision; LNCS 7766; pp. 82-92.

Prasad, M. N., et al.; Automatic Segmentation of Lung Parenchyma in the Presence of Diseases Based on Curvature of Ribs; 2008; Acad. Radiol.; 15:1173-1180.

Song, S., et al.; Segmentation of Abdominal Organs Incorporating Prior Knowledge in Small Animal CT; 2010; Advances in Visual Computing; LNCS 6455; pp. 209-218.

Sun, S., et al.; Robust Active Shape Model Based Lung Segmentation in CT Scans; 2011; LObes and Lung Analysis (LOLA2011) pp. 213-223.

Wang, H., et al.; Estimation of Mouse Organ Locations Through Registration of a Statistical Mouse Atlas With Micro-CT Images; 2012; IEEE Trans. on Medical Imaging; 31(1)88-102.

Zhang, L., et al.; Atlas-driven lung lobe segmentation in volumetric X-ray CT images; 2006; IEEE Trans. on Medical Imaging; 25(1)1-16.

* cited by examiner

MULTI-STRUCTURE ATLAS AND/OR USE THEREOF

CROSS REFERENCE TO RELATED APPLICATIONS

This application is a national filing of PCT application Serial No. PCT/IB2013/058912, filed Sep. 27, 2013, published as WO 2014/057383 A2 on Apr. 17, 2014, which claims the benefit of U.S. provisional application Ser. No. 61/711,405 filed Oct. 9, 2012, which is incorporated herein by reference.

The following generally relates to a multi-structure atlas and/or use thereof in connection with processing structural and/or functional imaging data. Such imaging data can be generated by a computed tomography (CT), X-ray, Ultrasound (US), magnetic resonance (MR), positron emission tomography (PET), single photon emission computer tomography (SPECT), combination (e.g., PET/CT, etc.), and/or other scanner.

Image data based analysis has provided useful information. For example, image data based lung lobe analysis has been used in connection with identifying chronic obstructive pulmonary disease (COPD), determining lobe functional characteristics, etc. However, segmenting certain anatomy such as the lung lobes from image data can be a challenging task as some anatomy such as the lung lobe lines (fissures) can be difficult to localize in image data, even in image data produced from a high resolution scan.

Using a hybrid scanner (i.e., a scanner configured with multiple modalities) having both structural and functional imaging capabilities (e.g., a PET/CT scanner), if the lung lobes can be segmented successfully from structural image data, the segmented lung lobes can be registered and/or otherwise combined with functional image data to identify the lung lobes in the functional image data, producing image data with useful anatomical and functional information of the lung lobes.

With structural and functional image data, anatomy such as the lung lobes have been segmented automatically via a computing system using a single organ anatomical (e.g., lung lobe) model, which is fitted to the image data to locate the anatomy of interest. The segmentation can be modified by a clinician, who can either accept or reject the segmentation. Such segmentation has also been performed manually by a clinician employing a segmentation software application.

Unfortunately, automated based techniques are challenging and often require user intervention, which consumes clinician time that could otherwise be used with patients and/or other tasks. Furthermore, the signal organ anatomical models are approximations, which may introduce error in the segmentations, for example, at boundaries and/or elsewhere. As a result of such error, segmentation and/or quantification values may lack accuracy.

Aspects described herein address the above-referenced problems and others.

In one aspect, an image data processor includes a structural image data processor that employs a multi-structure atlas to segment a region of interest from structural image data that includes tissue of interest and that segments the tissue of interests from the region of interest. The image data processor further includes a functional image data processor that identifies the tissue of interest in functional image data based on the segmented tissue of interest.

In another aspect, an image data processor includes a multi-structure atlas generator (104) that generates a multi-structure atlas. The multi-structure atlas physically maps structure to tissue of interest by localizing the structure in structural image data based on the multi-structure atlas that localizes the tissue of interest from the region of interest.

In another aspect, a method includes employing a multi-structure atlas to segment a region of interest from structural image data that includes tissue of interest and that segments the tissue of interests from the region of interest. The method further includes identifying the tissue of interest in functional image data based on the segmented tissue of interest.

In another aspect, a method includes generating a multi-structure atlas. The multi-structure atlas physically maps structure to tissue of interest such that locate the structure in structural image data based on the multi-structure atlas localizes the tissue of interest to the region of interest.

The invention may take form in various components and arrangements of components, and in various steps and arrangements of steps. The drawings are only for purposes of illustrating the preferred embodiments and are not to be construed as limiting the invention.

FIG. 1 schematically illustrates a computing system, including a multi-structure atlas generator and an image data processor, in connection with multiple imaging systems.

FIG. 2 schematically illustrates an example of the multi-structure atlas generator of FIG. 1.

FIG. 3 schematically illustrates an example of the image data processor of FIG. 1.

The following describes an approach to localize difficult to locate tissue in image data based on a multi-structure atlas. The atlas includes easier to locate and segment structure spatially or physically mapped to the location at or near the tissue. This allows for localizing the tissue based on the locating the structure via the atlas. Once localized, the tissue can be segmented more accurately, relative to segmenting without first localizing, and the segmented tissue of interest can be used to identify the tissue in functional image data.

Figure 1:
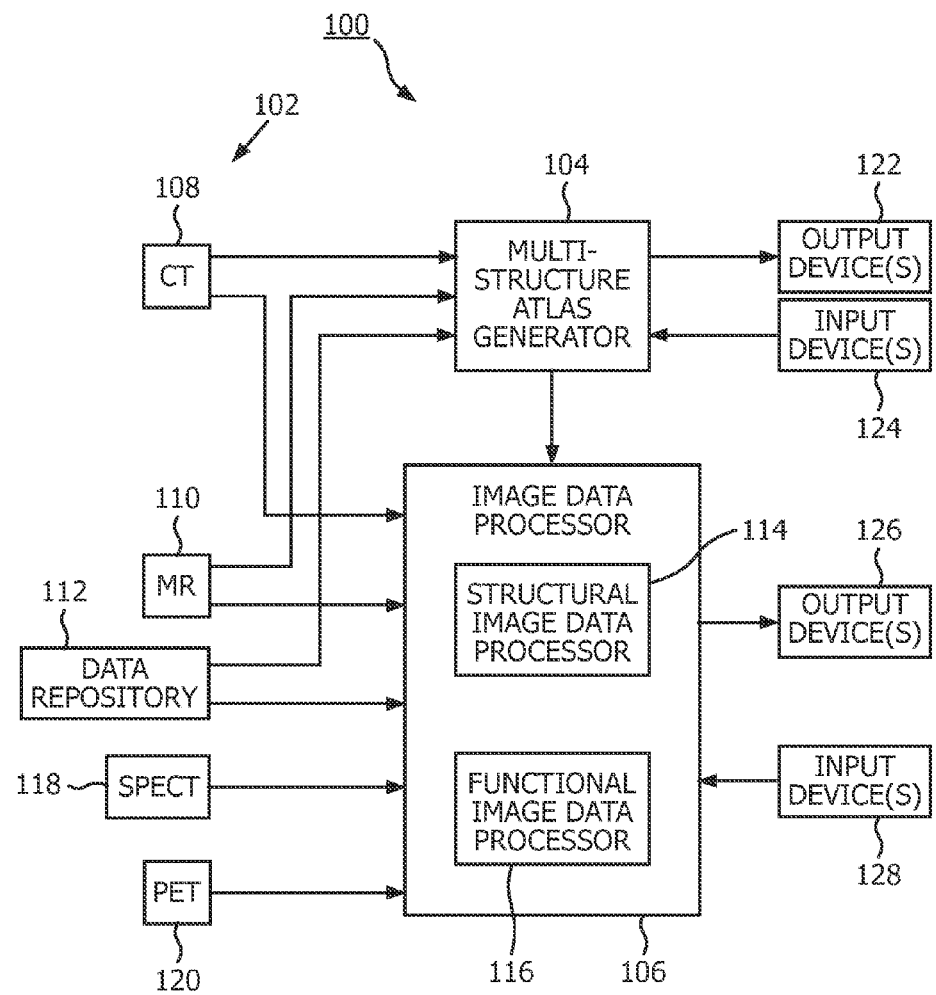

Initially referring to FIG. 1, a computing system 100 is schematically illustrated in connection with multiple imaging systems 102. The computing system 100 includes a multi-structure atlas generator 104 and an image data processor 106.

The multi-structure atlas generator 104 and/or the image data processor 106 can be implemented with one or more computing processors of one or more computing devices executing one or more computer readable instructions encoded on computer readable storage medium such as physical memory and/or other non-transitory medium, and/or computer readable instructions carried by a signal, carrier wave and/or other transitory medium.

The multi-structure atlas generator 104 generates a multi-structure atlas from atlas generating structural image data. The term "multi-structure atlas" as utilized herein refers to an atlas that includes two or more different structures (e.g., rib and lung) in their anatomical frame of reference with respect to each. As such, the different structures are spatially or physically mapped to each other. An atlas including only a single anatomical organ (e.g., lung only) is not a multi-anatomical structure atlas.

As described in greater detail below, in one instance, the multi-structure atlas generator 104 generates a multi-structure atlas based on structure that is easier to locate and segment in structural image data and tissue of interest that is more difficult to locate and segment in the structural image data, where the structure spatially or physically maps to the tissue of interest such that locating structure via the atlas localizes the more difficult to locate and segment tissue of interest. An example of such a structure is bone such as ribs, vertebrae, etc., and examples of such tissue include lung lobes, bronchi, vessels, kidney, liver, heart, etc.

The illustrated multi-structure atlas generator 104 obtains structural image data from a CT scanner 108 and/or a MR scanner 110 and/or a data repository 112. Other suitable scanners include, but are not limited to, an x-ray, ultrasound, a combination thereof (including hybrid scanner with multiple modalities), etc. scanner. The data repository 112 may include a picture archiving and communication system (PACS), a radiology information system (RIS), a hospital information system (HIS), and/or the like.

The multi-structure atlas can be conveyed to one or more output devices 122 such as a display monitor for visual presentation, storage medium, a filmer, a printer, the image data processor 106, etc. One or more input devices 124 allows a human and/or machine (e.g., robot) user to interact with the multi-anatomical structure atlas generator 104, for example, to facilitate selecting image data for processing, identifying structure for the atlas, segmenting structure and/or tissue of interest, etc.

The multi-structure atlas generator 104 can generate one or more multi-structure atlases. For example, the multi-structure atlas generator 104 can generate a multi-structure atlas based on subject age, size, weight, gender, and/or other characteristics. In another example, the multi-structure atlas generator 104 can generate a single general multi-structure atlas that is independent of subject age, size, weight, gender, and/or other characteristics.

The image data processor 106 includes a structural image data processor 114 and a functional image data processor 116. In a variation, at least one of the structural image data processor 114 or the functional image data processor 116 is not part of the image data processor 106.

The structural image data processor 114 is configured to at least segment predetermined tissue of interest from structural image data under evaluation based on the multi-structure atlas. As described in greater detail below, in one instance, this may include localizing a region of interest that includes the tissue of interest in structural image data based on the multi-structure atlas, and segmenting the tissue of interest from the region of interest in the structural image data.

Likewise, the structural image data can be obtained from the CT scanner 108, the MR scanner 110, a combination thereof (including a hybrid scanner), other scanner, the data repository 112, etc. However, in this instance, the structural image data is from an examination under evaluation. The predetermined tissue of interest can be identified based on the segmentation algorithm employed, a default configuration file, a user input, and/or otherwise.

The segmented predetermined tissue of interest can be conveyed to one or more output devices 126 such as a display monitor for visual presentation, storage medium, a filmer, a printer, the functional image data processor 116, etc. One or more input devices 128 allows a human and/or machine (e.g., robot) user to interact with the image data processor 106. Such interaction may include providing an input that identifies the tissue of interest, a segmentation algorithm, etc.

The functional image data processor 116 is configured to at least identify the predetermined tissue of interest in functional image data. As described in greater detail below, in one instance this includes employing the structural image data, the structural image data registered with the functional image data, and the segmented predetermined tissue of interest, which was segmented from the structural image data, to identify the predetermined tissue of interest in functional image data.

The functional image data can be obtained from the CT scanner 108, the MR scanner 110, a SPECT scanner 118, a PET scanner 120, a combination thereof (including a hybrid scanner) and/or other functional imaging scanner, the data repository 112, etc. The functional image data processor 116 can also process the identified tissue of interest in the functional image data and quantify functional information corresponding thereto.

The functional image data with the identified tissue of interest and/or the quantified functional information (e.g., indicia indicative of the quantification) can be conveyed to the one or more output devices 126. This can be concurrent with the display of image data or not. The one or more input devices 128 allows a human and/or machine (e.g., robot) user to interact with the image data processor 106. Such interaction may include providing an input that identifies the tissue of interest, a registration algorithm, a quantification algorithm, etc.

A suitable CT scanner 108 includes a stationary gantry and a rotating gantry, which is rotatably supported by the stationary gantry and rotates around an examination region about a z-axis. A radiation source, such as an x-ray tube, is rotatably supported by the rotating gantry, rotates with the rotating gantry, and emits radiation that traverses the examination region. A radiation sensitive detector array subtends an angular arc opposite the radiation source across the examination region. The detector array detects radiation traversing the examination region and generates projection data indicative thereof. A reconstructor reconstructs the projection data, generating 3D volumetric image data.

A suitable MR scanner 110 includes a main magnet, gradient (x, y, and z) coils, and a RF coil. The main magnet (superconducting, resistive, or permanent) produces a substantially homogeneous, temporally constant main magnetic field $B_0$ in the examination region. The gradient coils generate time varying gradient magnetic fields along the x, y, and z-axes of the examination region. The RF coil produces radio frequency signals (at the Larmor frequency of nuclei of interest (e.g., hydrogen, etc.)) that excite the nuclei of interest in the examination region and receive MR signals emitted by the excited nuclei. A MR data acquisition system processes the MR signals, and a MR reconstructor reconstructs the data and generates MR images.

A suitable SPECT scanner 118 includes a gamma radiation detector and a collimator, which is disposed between an examination region and the gamma radiation detector. The collimator includes radiation attenuating septa that only allow gamma radiation having a certain angle of incidence to reach the gamma detector. Gamma rays are acquired from a number of angles with respect to the examination region by rotating the gamma radiation detector around the examination region. The detector generally is positioned close to the subject under evaluation. A SPECT reconstructor reconstructs the projections to produce volumetric data representative of the distribution of the radioisotope emitting the gamma rays in the object or subject.

A suitable PET scanner 120 includes a ring of gamma radiation detectors arranged around an examination region. The detectors are configured to detect 511 keV gamma rays indicative of electron-positron decays occurring in an examination region. Most decays result in two 511 keV gamma rays emitted almost 180 degrees to each other, and PET scanners localize the source along a line of response (LOR) there between. The detectors convert the photons into a corresponding electrical signal, and a coincidence event identifier identifies coincident gamma pairs by identifying photons detected in temporal coincidence. The identified pairs are used to generate data indicative of the spatial distribution of the decays.

Figure 2:
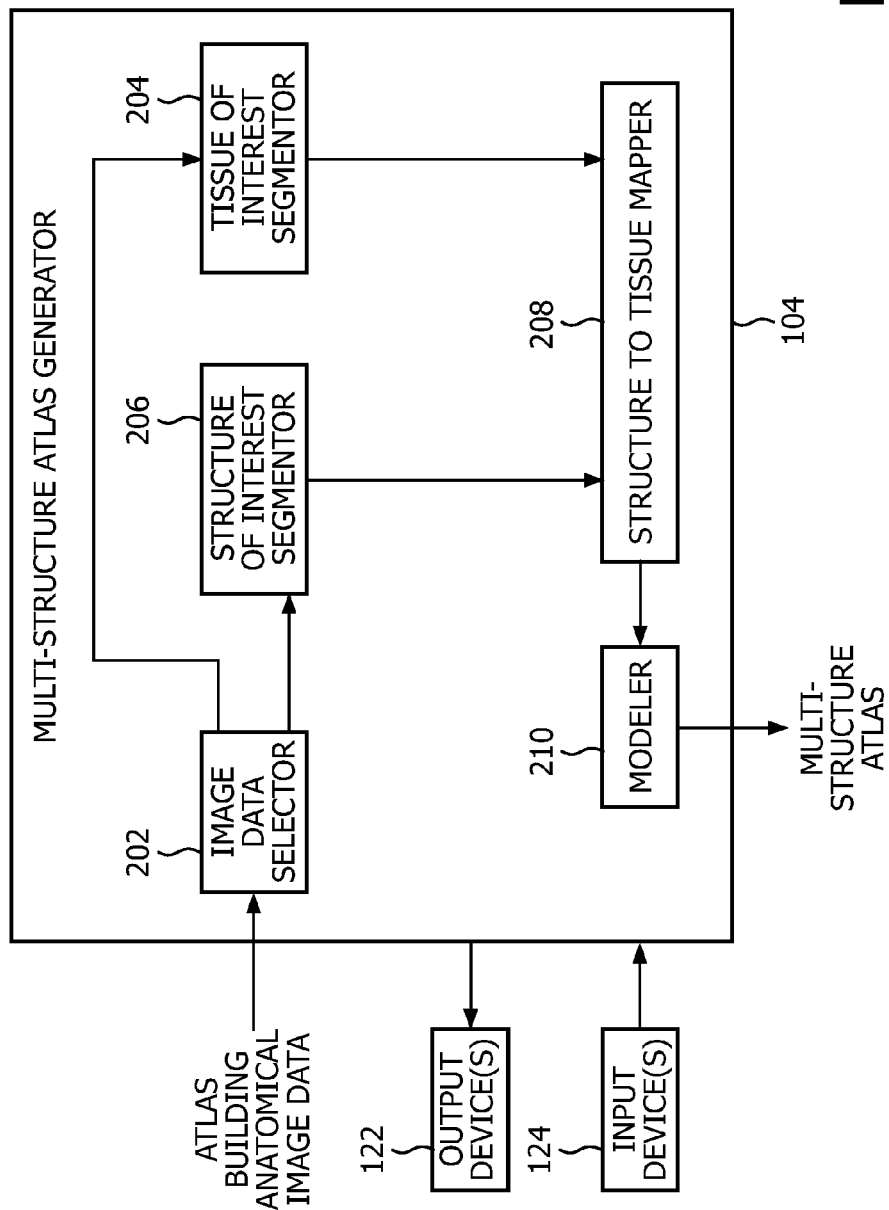

Turning to FIG. 2, an example of the multi-structure atlas generator 104 is illustrated. As discussed above, the multi-structure atlas generator 104 obtains and processes structural image data for producing atlases. Generally, such image data is from prior scans, not currently under evaluation, from multiple different subjects, and covering the structure/region and the tissue of interest.

An image data selector 202 selects all or a sub-set of the obtained structural image data for processing. A suitable sub-set may include image data for a sub-set of the subjects and/or image data corresponding to particular demographics (e.g., weight, size, age, gender, etc.). The image data selector 202 selects the anatomical image data with or without user interaction. In a variation, the image data selector 202 is omitted, and either all of the obtained image data is utilized or another approach is employed to select a sub-set of the image data.

A tissue of interest segmentor 204 segments predetermined tissue of interest from each of the selected image data. In the illustrated embodiment, the predetermined tissue of interest represents tissue of interest that is not as well-suited for automated segmentation techniques, or tissue of interest that is relatively more difficult to locate and segment. Generally, this segmentation is performed with user interaction. Known and/or other segmentation algorithms can be employed.

A structure or region of interest segmentor 206 segments a predetermined structure of interest from each of the selected image data. In the illustrated embodiment, the predetermined structure of interest represents structure that is well-suited for automated segmentation techniques, or structure that is relatively easier to locate and segment, and that spatially maps to the tissue of interest. Known and/or other segmentation algorithms can be employed by the structure of interest segmentor 206, typically without user interaction.

A structure to tissue mapper 208 spatially or physically maps (or generates a map or mapping), for each sub-set of image data, the segmented structure and the segmented tissue of interest based on their anatomical spatial context in the image data. Thus, the spatial relationship between the structure and the tissue of interest in the original image data is maintained. The mapping is such that a particular sub-portion of the structure is physically at or near the tissue of interest such that locating the particular sub-portion identifies the region in which the tissue of interest is most likely to be found.

A modeler 210 generates the multi-structure atlas based on the mappings for all (or a sub-set of) the sub-sets of image data. The atlas includes both the structure and the tissue of interest, and the spatial relationship or physical mapping there between. In one instance, this includes generating the atlas based on an average of the mappings. In another instance, this includes using the mapping that occurs with the greatest frequency. In yet another instance, this includes utilizing a user to identify one of the mappings.

Figure 3:
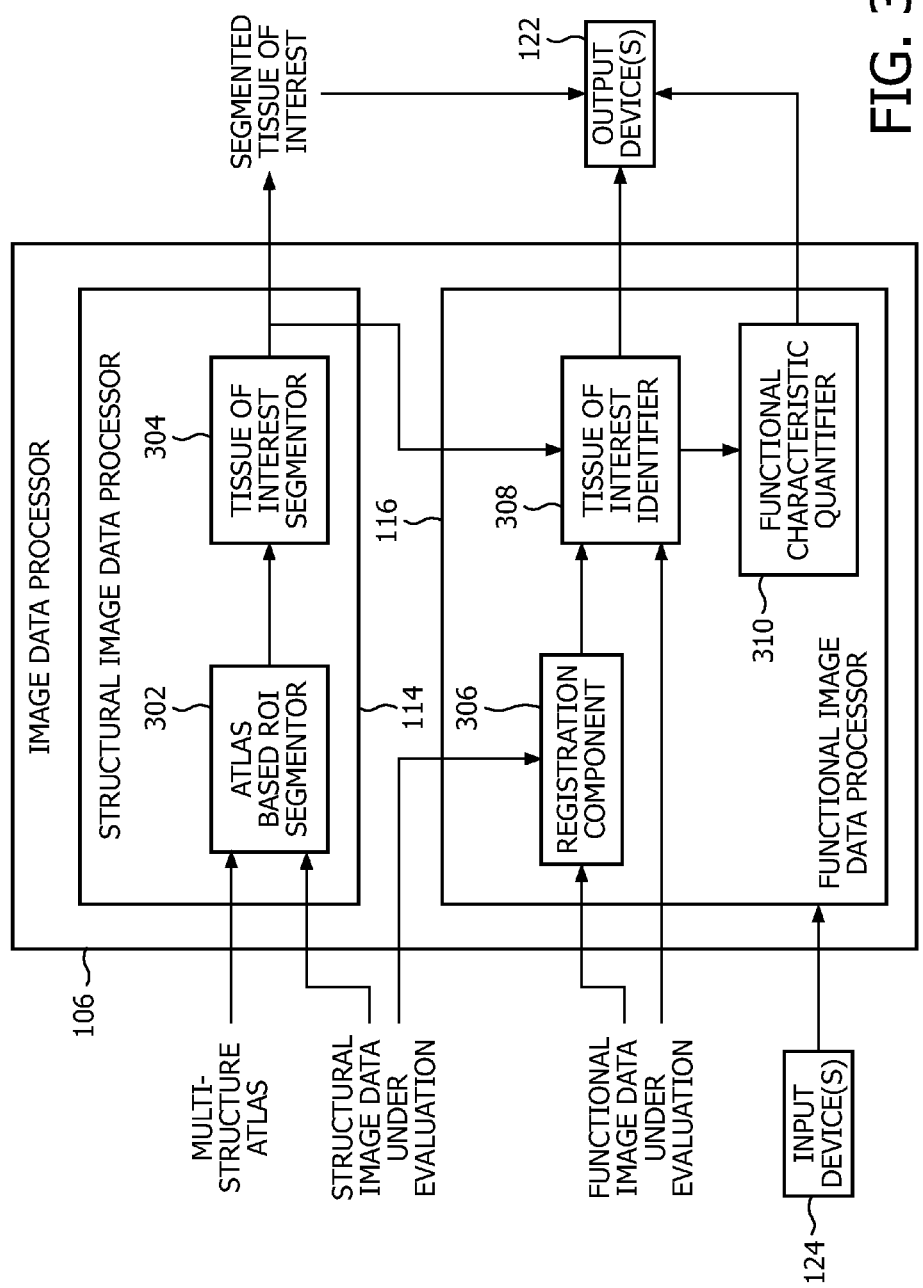

Next at FIG. 3, an example of the image data processor 106 is schematically illustrated.

The structural image data processor 114 includes an atlas based region of interest (ROI) segmentor 302. The atlas based ROI segmentor 302 segments an ROI from structural image data under evaluation based on the multi-structure atlas. For example, the atlas based ROI segmentor 302 segments a ROI that includes structure from the atlas that physically maps to the location of the tissue of interest in the atlas.

This may include registering the structural image data and the multi-structure atlas using either a non-rigid or a rigid registration algorithm. The ROI can then be extracted from the registered structured data either automatically or with user intervention. The ROI can be in any form, such as a sub volume, a point cloud, a 3D sheet of a given thickness or any other 3D structure. The ROI provides a localized region that includes the tissue of interest.

The structural image data processor 114 also includes a tissue of interest segmentor 304. The tissue of interest segmentor 304 receives the ROI segmented by the atlas based ROI segmentor 302. The tissue of interest segmentor 304 segments the predetermined tissue of interest from the segmented ROI. As discussed herein, segmenting the tissue of interest from the localized ROI facilitates accurate segmentation of the tissue of interest, which might otherwise be difficult to locate and segment from the entire structural image data. Likewise, the segmentation can be automated and/or include user interaction.

The functional image data processor 116 includes a registration component 306, a tissue of interest identifier 308, and a functional characteristic quantifier 310. The registration component 306 registers the functional image data under evaluation with the structural image data under evaluation. The tissue of interest identifier 308 identifies the tissue of interest in the functional image data based on the functional image, the registered image data and the segmented tissue of interest. As discussed herein, this facilitates accurate identification of the tissue of interest in the functional image data.

The functional characteristic quantifier 310 quantifies one or more functional characteristics from the identified tissue of interest in the functional image data. Such quantification may correspond to a radiation activity in the tissue of interest, a perfusion in the tissue of interest, etc. Although shown as part of the functional image data processor 116, in a variation, the functional characteristic quantifier 310 can be part of a different component, including another component of the image data processor 106 and/or a component external to the image data processor 106.

As discussed above, the image data processor 106 can employ the output device(s) 122, and where the output device(s) is a display monitor, the image data processor 106 can visually present one or more of the segmented tissue of interest from the anatomical image data, the identified tissue of interest in the functional image data, and/or the one or more quantified functional characteristics via the output device(s) 122.

Figure 4:
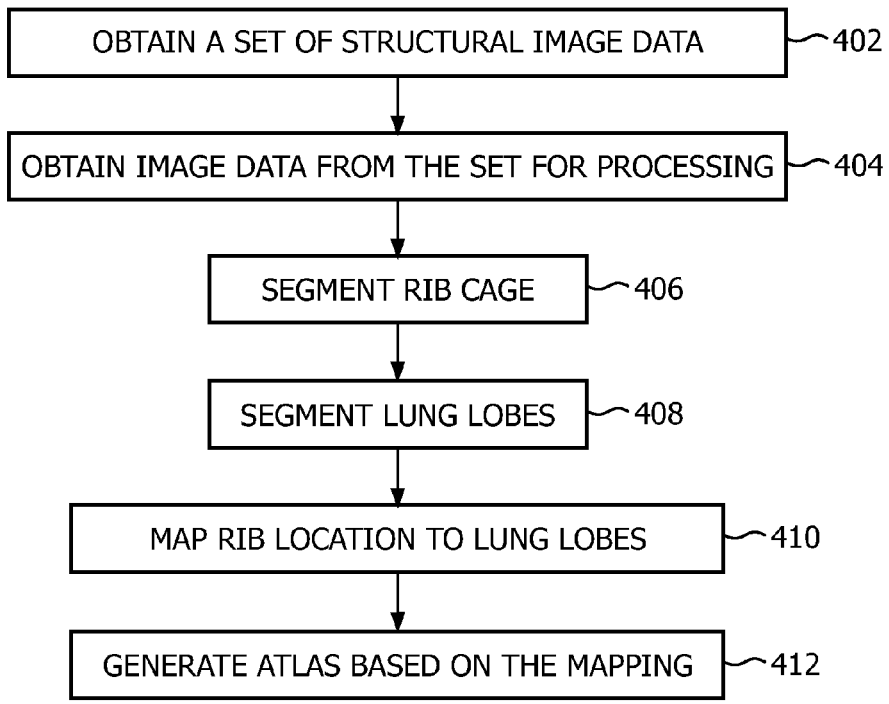
FIG. 4 illustrates an example method for determining a multi-structure atlas.

FIG. 4 illustrate methods for generating a multi-structure atlas. It is to be appreciated that the ordering of the acts is not limiting. As such, other orderings are contemplated herein. In addition, one or more acts may be omitted and/or one or more additional acts may be included.

For explanatory purposes and sake of brevity the method is discussed in the context of lung lobe evaluation based on a rib cage/lung lobe atlas, where ribs correspond to the structure easier to locate and the lung lobe corresponds to the tissue of interest. Generally, ribs are static bone structure relative to and surrounding the lungs, do not change much with breathing motion, and are fairly easy to segment in structural image data.

At 402, a set of structural image data, including image data of the rib cage, is obtained. As discussed above, the image data may correspond to different people and a plurality of exams and can be obtained from a scanner and/or a data repository.

At 404, the set or a sub-set of the image data is identified for further processing. The sub-set of image data can be based on demographics such as age, weight, size, gender, and/or other characteristics.

At 406, the rib cage is segmented from the image data for each exam. Generally, this can be achieved through automated segmentation techniques as the rib cage represents easier to locate and segment anatomy.

At 408, the lung lobes are segmented from the image data for each exam. Generally, this can be achieved through manual and/or semi-automated segmentation techniques as the fissures between lung lobes and lung lobe boundaries can be difficult to locate and segment. Semi-automatic and manual lung lobe segmentation technique may result in identifying the fissure location of each lobe at the boundary of the lungs in 3D or the fissure location across the lungs in 3D. The former will result in a 3D point cloud (of lobe fissures at the surface of the lungs), whereas the latter will result in a 3D surface across the lungs (representing the lobe fissure boundaries). Fissure identification can be performed in 3D or on 2D slices that are later merged into 3D volume.

At 410, a map (or mapping), for each examination, between rib location and lung lobe location is generated based on the segmented rib cage image data and the segmented lung lobes.

By way of example, for one examination, the mapping may indicate that a lung lobe boundary is located between ribs M and N, where M and N are integers. Another examination may indicate the same. Yet another examination may indicate the lung lobe boundary is between a next pair of ribs.

In a variation, the atlas may generate the ROI that has a set of 3D points representing the point cloud on the lung boundary with a high probability of having fissure boundary on the lung surface, and/or a 3D ROI across the lung having a high probability of having the fissure boundary across the lung.

For the one examination, the mapping may also indicate that a lung lobe boundary is located a distance X from rib M and a distance Y from rib N, where X and Y are integers. For the other examination indicating the same pair of ribs, the mapping may indicate that a lung lobe boundary is located a distance I from rib M and a distance J from rib N, where I and J are integers and are different from X and Y.

The locations of the lung lobe boundary may also be mapped in terms of physical spacing e.g. lung lobe boundary on the surface of the lung may be located within a range (e.g., $X_1 \pm Y_1$ millimeters from rib G, and $X_2 \pm Y_2$ millimeters from rib H), where G lies above rib H, or vice-versa. In another scenario, the atlas may also result in a mapping of an L millimeter thick 3D ROI (in form of a 3D sheet) with a high probability of having fissures across the lung volume At 412, a rib cage/lung lobe atlas is generated based on the mappings for all or a sub-set of the exams. As discussed herein, the atlas may be based on an average mapping, a most frequently occurring mapping, a user selected mapping and/or other mapping. For example, for averaging, using the above example, mapping may indicate that the rib M is a distance (X+I)/2 from the boundary and the rib N is a distance (Y+J)/2 from the boundary.

Figure 5:
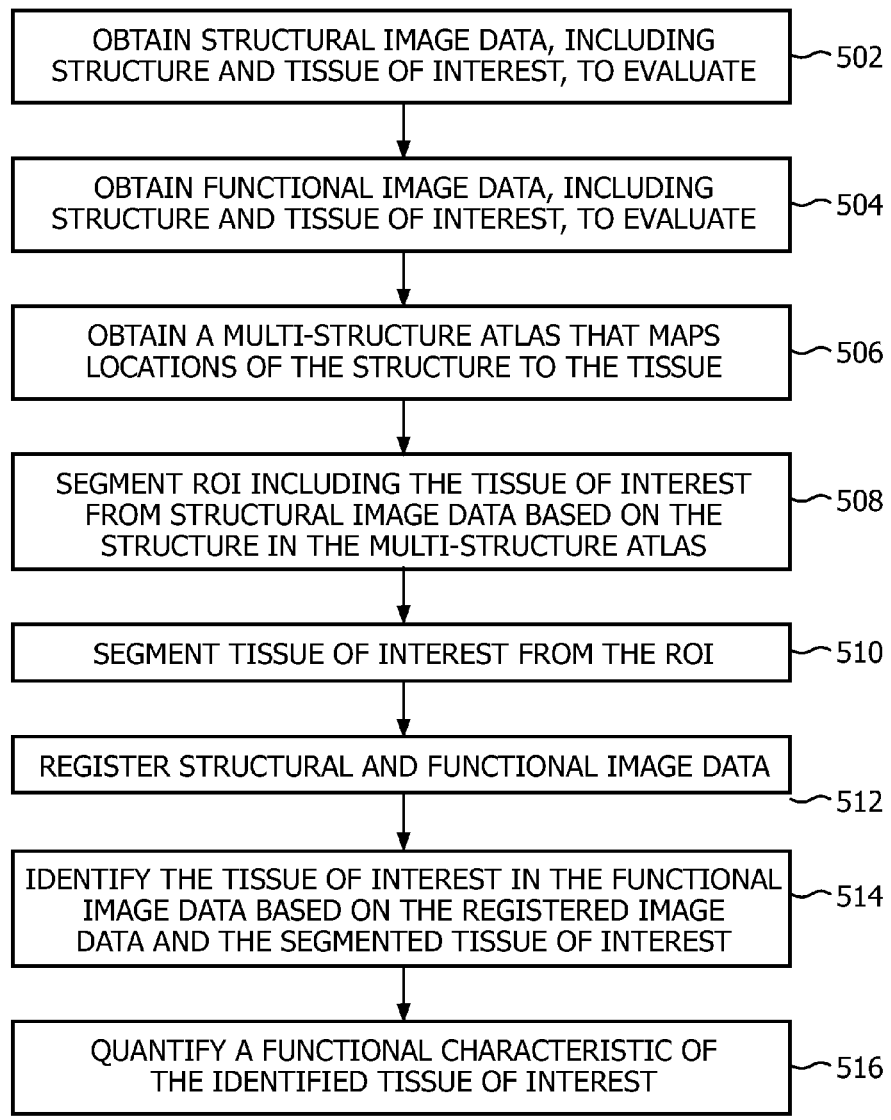
FIG. 5 illustrates an example method for employing the multi-structure atlas of FIG. 4.

FIG. 5 illustrate methods for utilizing the multi-structure atlas of FIG. 4 for segmentation. It is to be appreciated that the ordering of the acts is not limiting. As such, other orderings are contemplated herein. In addition, one or more acts may be omitted and/or one or more additional acts may be included.

Continuing with the example in FIG. 4, with this example, the rib cage/lung lobe atlas is used to localize lung lobes for segmentation in structural image data and the segmented lung lobes are used to identify the lung lobes in functional image data.

At 502, structural image data, including image data of a chest of a subject, to evaluate is obtained.

At 504, functional image data, including image data of a chest of a subject, to evaluate is obtained.

At 506, a multi-structure atlas including the rib cage with rib locations mapped to the lung lobes is obtained. As discussed herein, the atlas may be generic or specific based on subject age, weight, size, gender, etc.

At 508, a region of interest (ROI) that includes the lung lobes is segmented based on the atlas.

With continuance of the example in FIG. 4, if the lung lobe boundary located between ribs M and N is the tissue of interest, then the ROI is based on the location of the ribs M and N in the atlas such that the ROI includes the boundary of interest.

Figure 6:
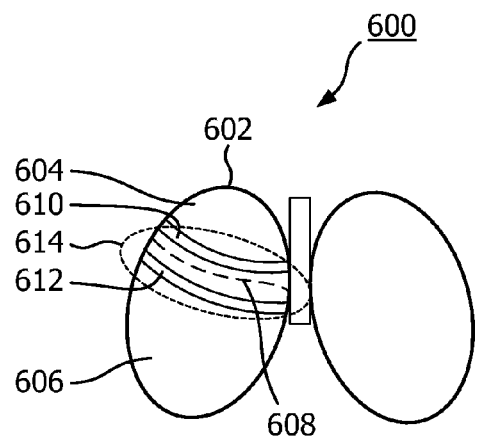
FIG. 6 illustrates an example lung lobe-rib cage atlas.

An example of such an atlas is shown in FIG. 6. In FIG. 6, an atlas 600 includes a lung lobe 602 with a first lobe 604 and a second lobe 606, separated at a boundary 608 that is located between a first rib 610 and a second rib 612.

With this atlas, the boundary 608 is localized based on the first and second ribs 610 and 612, and a ROI 614 may include a region around the ribs 610 and 612 (as shown) and/or between the ribs 610 and 612. Other ribs and lung structure are omitted from the atlas 600 for clarity purposes.

At 510, the lung lobes are segmented from the ROI.

At 512, the structural image data and the functional image data are registered.

At 514, the lung lobes are identified in the functional image data based on the registered image data and the lung lobes segmented from the structural image data.

At 516, optionally, a functional characteristic of the identified lung lobes in the functional image data is quantified.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

Although FIGS. 4 and 5 are described in connection with identifying lung lobes using a rib cage/lung lobe atlas, it is to be understood that this atlas and/or this tissue of interest (lung lobes in FIGS. 4 and 5) are not limiting. For example, the tissue can be kidney, heart, liver, bronchi, a vessel, and/or other tissue where the rib cage can be utilized as a spatial reference. Furthermore, the structure can be other structure such as the spine where individual vertebrae, instead of ribs, are utilized as spatial anatomical landmarks for the lung lobes. In yet another instance, both the structure and the tissue of interest can be different.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An image data processor, comprising:
a structural image data processor that employs a multi-structure atlas to segment a region of interest from structural image data which includes tissue of interest and that segments the tissue of interests from the region of interest, wherein the structure is rib cage and the tissue of interest is lung lobe, and the multi-structure atlas is a rib cage/lung lobe atlas that includes a mapping that maps one or more ribs to a location of a boundary of a lung lobe, and the mapping includes a lung lobe region of interest, in a form of a least one of a point cloud on a surface of the lung or a 3D sheet across lung, through the rib case/lung lobe atlas; and
a functional image data processor that identifies the tissue of interest in functional image data based on the segmented tissue of interest.

2. The image data processor of claim 1, wherein the functional image data processor further registers the structural image data and the functional image data and identifies the tissue of interest in the functional image data based on the segmented tissue of interest and the registered image data.

3. The image data processor of claim 1, wherein the functional image data processor further quantifies functional information in the identified tissue of interest in the functional image data.

4. The image data processor of claim 1, wherein the multi-structure atlas includes a mapping that physically maps locations of sub-structure of the structure of interest to the tissue of interest for each sub-image data of the image data corresponding to at least one of a different examination or a different subject, and the structural image data processor segments the region of interest based on the sub-structure in the atlas so that the region of interest includes the tissue of interest.

5. The image data processor of claim 4, wherein the mapping includes at least one of 1) a point cloud of the tissue of interest on or within an organ surface; 2) a 3D sheet having the tissue of interest across an organ; 3) or a 3D structure in a form of region of interest.

6. The image data processor of claim 4, further comprising:
a multi-structure atlas generator that generates the multi-structure atlas, the multi-structure atlas generator, comprising:
a structure of interest segmentor that automatically segments the structure from the structural image data based on a predetermined algorithm;
a tissue of interest segmentor that segments the tissue of interest from the structural image data based on user input;
a structure to tissue mapper that generates a map mapping a physical spatial location of each sub-structure to the segmented tissue of interest; and
a modeler that generates the multi-structure atlas based on a plurality of the maps.

7. An apparatus, comprising:
a processor that generates a multi-structure atlas, wherein the multi-structure atlas physically maps structure of interest to tissue of interest such that locating the structure of interest in structural image data based on the multi-structure atlas localizes the tissue of interest to the region of interest, wherein the processor generates the multi-structure atlas by:
automatically segmenting the structure from the structural image data based on a predetermined algorithm;
segmenting the tissue of interest from the structural image data with user interaction;
mapping a physical spatial location of the segmented structure to the segment tissue of interest; and
generating the multi-structure atlas based on a plurality of maps, wherein each map corresponds to sub-set of the image data for at least one of a different examination or a different subject.

8. The apparatus of claim 7, the processor is further configured to:
employ the multi-structure atlas to segment a region of interest from structural image data under evaluation which includes the tissue of interest and that segments the tissue of interests from the region of interest; and
register the structural image data and the functional image data and that identifies the tissue of interest in the functional image data based on the segmented tissue of interest and the registered image data.

9. The apparatus of claim 8, the processor further configured to:
quantify functional information in the identified tissue of interest.

10. A method, comprising:
employing a multi-structure atlas to segment a region of interest from structural image data which includes tissue of interest and that segments the tissue of interests from the region of interest, wherein the structure is rib cage and the tissue of interest is lung lobe, and the multi-structure atlas is a rib cage/lung lobe atlas that includes a mapping that maps one or more ribs to a location of a boundary of a lung lobe, and the mapping includes a lung lobe region of interest, in a form of a least one of a point cloud on a surface of the lung or a 3D sheet across lung, through the rib case/lung lobe atlas; and
identifying the tissue of interest in functional image data based on the segmented tissue of interest.

11. The method of claim 10, further comprising:
registering the structural image data and the functional image data and identifying the tissue of interest in the functional image data based on the segmented tissue of interest and the registered image data.

12. The method of claim 10, further comprising:
quantifying functional information in the identified tissue of interest.

13. The method of claim 10, wherein the multi-structure atlas physically maps structure to the tissue of interest for each sub-image data of the image data corresponding to at least one of a different examination or a different subject, and the structural image data processor segments the region of interest based on the structure in the atlas so that the region of interest includes the tissue of interest.

14. The method of claim 13, further comprising:
automatically segmenting the structure from the structural image data based on a predetermined algorithm;
segmenting the tissue of interest segmentor from the structural image data under user interaction;
mapping a physical spatial location of the segmented structure to the segment tissue of interest; and
generating the multi-structure atlas based on a plurality of mappings, each corresponding to a different sub-set of the image data.

15. A method, comprising:
generating a multi-structure atlas, wherein the multi-structure atlas physically maps structure to tissue of interest such that locating the structure in structural image data based on the multi-structure atlas localizes the tissue of interest to the region of interest, wherein generating the multi-structure atlas includes:
automatically segmenting the structure from the structural image data based on a predetermined algorithm;
segmenting the tissue of interest segmentor from the structural image data under user interaction;
mapping a physical spatial location of the segmented structure to the segment tissue of interest; and
generating the multi-structure atlas based on a plurality of mappings, each corresponding to a different subset of the image data.

16. The method of claim 15, further comprising:
employing the multi-structure atlas to segment a region of interest from structural image data that includes tissue of interest and that segments the tissue of interests from the region of interest; and
registering the structural image data and the functional image data; and
identifying the tissue of interest in the functional image data based on the segmented tissue of interest and the registered image data.

17. The method of claim 16, further comprising:
quantifying functional information in the identified tissue of interest.

18. The image data processor of claim 1, wherein, in response to a lung lobe boundary being located between a first rib and a second different rib in the tissue of interest, the functional image data processor identifies the region of interest from a location of the first and second ribs in the multi-structure map, and the region of interest includes the lung lobe boundary.

19. The image data processor of claim 18, wherein the functional image data processor localizes the lung lobe boundary based on the first and second ribs.

20. The image data processor of claim 18, wherein the functional image data processor determines the region of interest includes a region around the first and second ribs.

21. The image data processor of claim 18, wherein the functional image data processor determines the region of interest includes a region between the first and second ribs.

22. The image data processor of claim 18, wherein the multi-structure map indicates a lung lobe boundary is located a first distance from the first rib and a second distance from the second rib.

23. The image data processor of claim 18, wherein the multi-structure map includes a numerical value that indicates a physical spacing of the lung lobe boundary from a rib on a surface of the lung.

24. The image data processor of claim 1, wherein the multi-structure map indicates a thickness of the region of interest, in a form of the 3D sheet, with fissures across a lung volume.

25. The image data processor of claim 1, wherein the point cloud includes a set of 3D points on the lung boundary.

* * * * *